United States Patent
Hernadi (10) Patent No.: US 10,899,447 B2
(45) Date of Patent: Jan. 26, 2021

(54) METHODS FOR IMPROVEMENTS OF THE BOX WING AIRCRAFT CONCEPT AND CORRESPONDING AIRCRAFT CONFIGURATION

(71) Applicant: Andras Hernadi, Stockholm (SE)

(72) Inventor: Andras Hernadi, Stockholm (SE)

(73) Assignee: Andras Hernadi, Stockholm (SE)

( * ) Notice: Subject to any disclaimer, the term of this patent is extended or adjusted under 35 U.S.C. 154(b) by 363 days.

(21) Appl. No.: 15/512,546

(22) PCT Filed: Mar. 24, 2015

(86) PCT No.: PCT/SE2015/050349
§ 371 (c)(1),
(2) Date: Mar. 17, 2017

(87) PCT Pub. No.: WO2016/048211
PCT Pub. Date: Mar. 31, 2016

(65) Prior Publication Data
US 2017/0297708 A1    Oct. 19, 2017

Related U.S. Application Data

(60) Continuation of application No. 29/584,541, filed as application No. PCT/SE2015/050349 on Mar. 24, (Continued)

(30) Foreign Application Priority Data

Sep. 25, 2014   (EM) .................. 002544510-0001
Sep. 25, 2014   (EM) .................. 002544510-0002

(51) Int. Cl.
*B64C 39/06*     (2006.01)
*B64C 3/16*      (2006.01)
*B64C 5/02*      (2006.01)

(52) U.S. Cl.
CPC .............. *B64C 39/068* (2013.01); *B64C 3/16* (2013.01); *B64C 5/02* (2013.01)

(58) Field of Classification Search
CPC ... B64C 39/068; B64C 39/062; B64C 39/066; B64C 3/10; B64C 3/40; B64C 3/08
See application file for complete search history.

(56) References Cited

U.S. PATENT DOCUMENTS

| 3,834,654 A | 9/1974 | Miranda |
| 3,981,460 A | 9/1976 | Ratony |

(Continued)

FOREIGN PATENT DOCUMENTS

| EM | 002544510-0001 A1 | 10/2014 |
| EM | 002544510-0002 A1 | 10/2014 |

OTHER PUBLICATIONS

Pending Design U.S. Appl. No. 29/520,505 (not published yet), filed Mar. 16, 2015, wherein priority claimed from EM 002544510-0001 and EM 002544510-0002. This U.S. Appl. No. 29/520,505 is one of the priority documents for PCT/SE2015/050349.

(Continued)

*Primary Examiner* — Timothy D Collins
*Assistant Examiner* — Terri L Filosi (57) ABSTRACT

Aircraft configuration by applying the following method steps for improving the conventional box wing aircraft concept: dividing both the backward swept front and the forward swept rear wings into root and tip sections, wherein the tip sections (34) of the front wings are more backward swept than the root sections (37), and the tip sections (35) of the rear wings are more forward swept than the root sections (38). Preferred embodiments comprise moving the front wing to the nose and the rear wing towards the rear end of a long fuselage; adding a middle wing and thereby decreasing the wingspan by one third; dividing the middle wing into a backward swept root section (28) and two tip sections (Continued)

(29,30), one forward and another backward swept. The four wingtips on each side are interconnected by a wingtip fence (26), obtaining seven closed frame structures, as well as seven aerodynamic channels for the stream flow.

6 Claims, 9 Drawing Sheets

Related U.S. Application Data 2015, now Pat. No. D 844,538, said application No. 29/584,541 is a division of application No. 29/520,505, filed on Mar. 16, 2015, now Pat. No. Des. 843,920, said application No. PCT/SE2015/050349 is a continuation-in-part of application No. 29/520,505, filed on Mar. 16, 2015, now Pat. No. Des. 843,920.

(56) References Cited

U.S. PATENT DOCUMENTS

| | | |
|---|---|---|
| 4,146,199 A | 3/1979 | Wenzel |
| 4,365,773 A | 12/1982 | Wolkovitch |
| D275,021 S | 8/1984 | Brzack |
| D292,203 S | 10/1987 | Ligeti |
| D292,910 S | 11/1987 | McGiboney |
| D292,911 S | 11/1987 | Argondezzi |
| D311,720 S | 10/1990 | Butler |
| 5,046,684 A | 9/1991 | Wolkovitch |
| 5,503,352 A | 4/1996 | Eger |
| 5,899,409 A | 5/1999 | Frediani |
| 6,098,923 A | 8/2000 | Peters, Jr. |
| 6,474,604 B1 | 11/2002 | Carlow |
| D486,776 S | 2/2004 | Carr |
| D516,994 S | 3/2006 | Houck, II |
| D594,809 S | 6/2009 | Cazals |
| D594,810 S | 6/2009 | Cazals |
| D594,811 S | 6/2009 | Cazals |
| D595,206 S | 6/2009 | Cazals |
| D595,207 S | 6/2009 | Cazals |
| D595,208 S | 6/2009 | Cazals |
| D595,209 S | 6/2009 | Cazals |
| D598,838 S | 8/2009 | Carr |
| 8,657,226 B1 | 9/2014 | McGinnis |
| 8,820,673 B2 | 9/2014 | Cacciaguerra |
| 9,308,984 B2 | 4/2016 | Suokas |
| 2006/0144991 A1 | 7/2006 | Frediani |
| 2010/0200703 A1 | 8/2010 | Cazals |
| 2015/0048215 A1* | 2/2015 | McGinnis ............... B64C 9/00 244/90 R |

OTHER PUBLICATIONS

Hernadi, Andras, Design U.S. Appl. No. 29/520,505 (not published yet), filed Mar. 16, 2015, wherein priority claimed from EM 002544510-0001 and EM 002544510-0002.

* cited by examiner

FIG. 20 though text obscured likely begins properly — transcribing below:

METHODS FOR IMPROVEMENTS OF THE BOX WING AIRCRAFT CONCEPT AND CORRESPONDING AIRCRAFT CONFIGURATION

CROSS REFERENCE TO RELATED APPLICATIONS

This application claims priority from RCD EM 002544510-0001 and 002544510-0002, both filed on Sep. 25, 2014, with OHIM/OAMI Reference "StratosLiner"; and also, priority from U.S. Design patent application No. 29520505 filed on Mar. 16, 2015, titled "Backward and forward swept aircraft wing sections in a decagonal box wing configuration". The USPTO has divided said Design Application into two separate Divisional Applications and granted two Design Patents: U.S. D843,920 S (Mar. 26, 2019) and U.S. D844,538 S (Apr. 2, 2019). Chinese utility ("Invention") patent No. ZL201580051870.4 has been granted 2019 Aug. 16 (Application Date: 2015 Mar. 24). No. of announcement of grant: CN 107000841 B.

BACKGROUND OF THE INVENTION

This invention relates to the field of box wing aircraft design, with a focus on novel improvements of some of the features and adding new elements to the prior art in this field. The invention constitutes a new sub-class within Closed Wings (box wing, ring wing, joined wings) in the broader class Non-Planar Aircraft Wings.

The regular, conventional box wing configuration is comprised of a narrow backward swept front wing, a similarly narrow forward swept rear wing and a connecting non-lifting wingtip fence, a side wing, between the wingtips. The front wing root joins the lower part of the fuselage and the root of the rear wing joins the upper part of the fuselage, or the roots of the rear wings are elevated above the aft part of the fuselage using a vertical stabilizer, or two V-tail fins, for structural connection to the fuselage.

Most modern box wing aircraft designs with ambition for good aerodynamic performance have long and narrow wings such as WO 2004/074093 A1 or BG 65998 B1. Some designers reinforce the root of the thin and narrow front wing by using less sweep angle of the trailing edge at the root, for example BG 65998 B1. Other designers employ such an extra triangular area along half of the inboard trailing edge of the front wing, for easy installation of the flaps, such as DE 201 11 224 U1. The claims of WO 2004/074093 A1 focus on the aerodynamic channel between the tail fins and the rear wings. There is a box wing design where the inboard portion of the rear wing is anhedral and the outboard portion is dihedral, namely WO 88/06551 A1. Another design, WO 03/059736 A2, has three pairs of wings with the ambition of using the Coanda effect.

None of the cited prior art seems to show or suggest the combination of differently swept sections of both the front and rear wings. None of these patent documents are discussing the issue of reducing the wingspan of the box wing concept when using narrow wings. None of them are discussing the linkage between the cross-sectional area and the sweep angle of the wings, nor the application of the area rule method for better fuel storage in the fuselage by introducing wing sections with different sweep angles. The prior art seems to not pay attention to the length of the wingtip fence and novel options for structural strengthening of the box wing configuration.

The narrow front and rear wings of a box wing aircraft, together, must provide a sufficient wing area, compared to a monoplane aircraft with the same weight. Thereby, the wingspan of such a box wing aircraft is similar to that of a monoplane aircraft. For several reasons, a smaller wingspan is often preferable. Very large airliners should have a small wingspan to be manageable for our airports. It is desirable for airliners to carry more than a thousand passengers, but such a monoplane is difficult to design, because of the large wingspan.

Such a large aircraft is not easy to design as a box wing aircraft either. The wingspan is still large and the thin wings suffer bending and torsion, especially at the wingtips. The length of the wingtip fence is an important parameter for structural calculations. It may prove that the closed frame structure of the front and rear wings is not sufficiently strong and stiff. There is a risk that the wingtip fence of the regular, conventional box wing configuration must be strengthened a lot and might therefore be too heavy.

One of the general ideas behind using narrow wings is better aerodynamic performance. But airliners must carry a lot of fuel in the huge wings for long distance flights. There is not much place for fuel in the thin wings of a box wing aircraft.

It is necessary to obtain sufficient horizontal and vertical separation between multiple wings because of the aerodynamic interference issue. Otherwise, the box wing configuration is aerodynamically advantageous. The main streamline flow around the box wing aircraft is divided into two channels by the frame of the front and rear wings. There are three stream tube channels when the elevated rear wings and the fuselage are connected with V-tail fins. It would be preferable to have a narrow stream tube as a result of a small wingspan, and the aerodynamic performance would improve having more aerodynamic channels than two or three.

There is a box wing aircraft configuration implicitly disclosed in RCD EM 002544510-0001, a strictly aesthetic design, presented with not less than 12 measured pairs of dimensions with the Golden Ratio 1.618. Furthermore, there are also 13 leading and trailing edges presented with the measured Golden Angle and the angles of the Golden Triangle, as they are generally considered sources of beauty. The reason for these designs was to test the thesis: if an airplane is beautiful, it flies beautifully. The four engines of the aircraft in question form no part of the claimed design but this aircraft is not functional because all the four engines are clearly Ramjet-type engines which need an established airflow of several hundred km/h to start. The present invention is addressing this issue, too.

Furthermore, airport boarding bridges are not designed for a box wing aircraft. This problem must be resolved if the box wing concept is to be used for large passenger aircraft.

SUMMARY OF THE INVENTION

As the result of applying several method steps for improving the regular, conventional box wing concept, the preferred embodiment of the present invention comprises an extended fuselage; a pair of backward swept front wings attached to the front bottom of the fuselage; a pair of elevated forward swept rear wings with their roots joined together above the aft part of the fuselage; a highly swept wingtip fence on each side, connecting the wingtips of the front and rear wings; a V-tail, for structural connection between the rear wings and the fuselage; furthermore also a middle wing, extending from the upper middle part of the fuselage.

The front wing is divided into a dihedral root section, swept basically as the wing of a modern airliner, and a more dihedral and more swept tip section. The rear wing is divided into a basically horizontal root section, with a sweep angle similar to the swept wing of a modern airliner but forward swept, and a tip section, slightly anhedral and more forward swept than the root section.

In the preferable embodiment, the middle wing is divided into a basically horizontal or slightly anhedral root section and two tip sections, one forward swept and anhedral, another backward swept and dihedral. The front, middle and rear wings have four tip sections on each side of the aircraft. All the four wingtips of these are attached to the wingtip fence; two are joined to the front portion and two to the aft portion of the wingtip fence.

The root section of the middle wing is a suitable place for engines. If we use two traditional inner engines instead of the Ramjet-type engines disclosed in the above-mentioned design, EM 002544510-0001, the aircraft will be functional because gas turbine engines can give the aircraft the necessary velocity needed for the two outer, Ramjet-type engines to start.

The fuselage of the present invention is area ruled which is a regular design procedure. The result is that a long middle section of the extended fuselage has a wide belly which can contain both landing gears and a large fuel tank. Dividing the front and rear wings into differently swept sections increases the cross-sectional area both front and rear and decreases it along a longer middle part of the aircraft. This novel, distinguishing feature makes a wider fuselage belly and thereby a larger fuel tank possible, the area rule design method still applied.

Another reason for using differently swept sections of the front and rear wings is that the wingtip fence would otherwise have been too long and too weak, especially when the fuselage is long and the front and rear wings are well separated horizontally.

With a middle wing introduced, the necessary wing area is distributed to three narrow wings, which makes a smaller wingspan, reduced by one third, possible. Shorter wings are stronger than long wings. Having a middle wing with two tip sections, both supporting the wingtip fence, is a desired feature if the box wing structure is to be strengthened.

The wings and fins of the regular, conventional box wing aircraft form two, or three, closed frames. Having a middle wing with two tip sections, the number of strong and stiff closed frame structures will be seven, formed by the 14 wing sections, together with the wingtip fences, the two V-tail fins and the fuselage.

These seven frames provide not only novel structural features but distinguishing aerodynamic benefits as well. These seven frames divide the stream tube around the aircraft into seven airflow channels. Using one vertical stabilizer instead of V-tail fins, the channels will be reduced to six. Embodiment with a simple middle wing can result in four or five aerodynamic channels, with one stabilizer or two V-tail fins, respectively.

There are a number of other qualities of the present invention which should be briefly mentioned, where the distinguishing features of the present invention improve, or significantly improve, the functioning of the box wing aircraft as such. These improved functions are flexibility with cargo placement; reduced concerns as regards stalling; good maneuverability and stability in difficult flying conditions; redundant aerodynamic devices in many places that also provide more safety; lower angle of attack as well as reduced speed and less engine power with less noise at takeoff and landing; etc. The invention also makes it possible to build very large, extended aircraft with a manageable wingspan where the distributed load on the three relatively short box wings allows using more composite materials in the wings that are still thin and strong.

DETAILED DESCRIPTION OF THE INVENTION

Referring now to the drawings, most of the embodiments show a large airliner or cargo plane. The present invention is in no way limited to this type of aircraft; it is applicable to any aircraft of any size, any purpose and application;

manned or unmanned; and with any type of propulsion or combination of different propulsion systems for different flying conditions, without any limit as regards speed, altitude or function. The scope of the invention is not limited by materials. Any materials can be used allowing the construction and operation of the invention. Airfoils and other details of the embodiment and structure are established in a way that will be understood by those skilled in the art. Throughout the drawings, the symmetric aircraft parts, one positioned on one side of the fuselage and another on the opposite side, are provided with only one particular reference numeral when it is clear that the numbered item has an identical mirrored counterpart.

Figure 1:
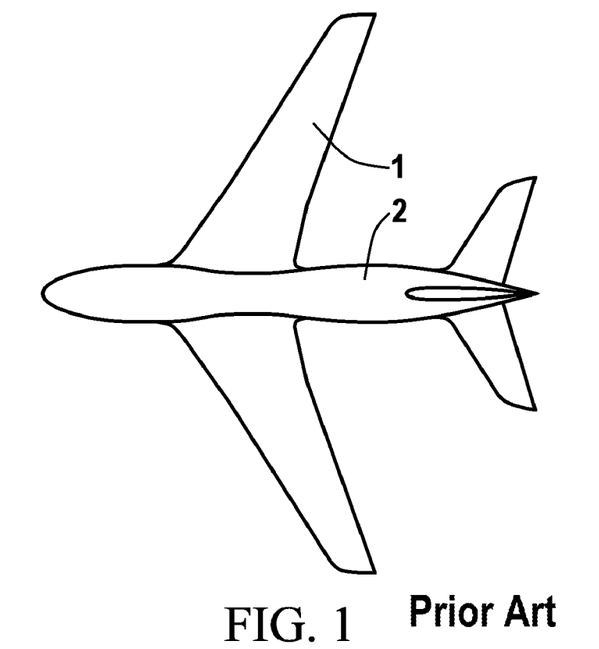
FIG. 1 is a top view illustration of the monoplane wing concept.
Figure 2:
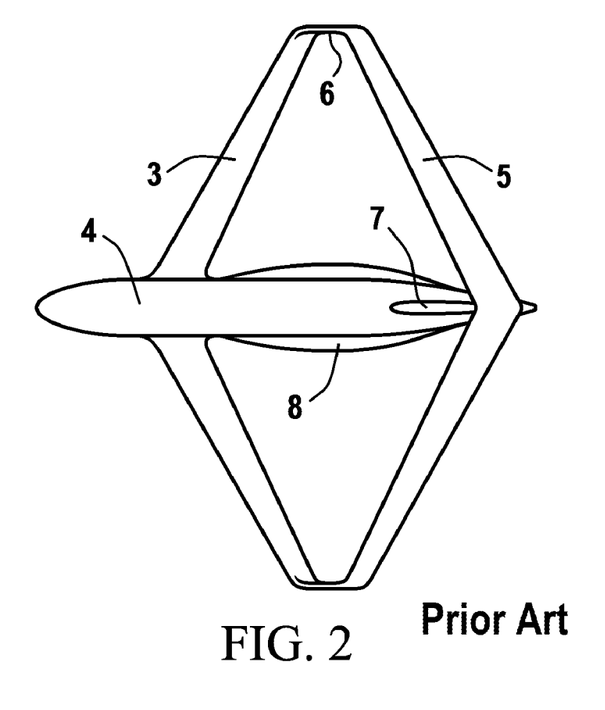
FIG. 2 is a top view illustration of the regular, conventional box wing concept.

FIG. 1 is a top view illustration of the regular monoplane concept of today's civilian aircraft, for comparisons with FIG. 2, which is a basic illustration of the regular, conventional box wing concept of an aircraft with the same overall length. The regular monoplane has one pair of backward swept wings 1, mounted to the fuselage 2.

FIG. 2 is a top view illustration of the basic box wing configuration of the prior art, comprising a pair of backward swept front wings 3, mounted to the lower part of the fuselage 4; a pair of forward swept rear wings 5 and a wingtip fence 6 which is a structural interconnecting vertical fin between the wingtips. The roots of the two rear wings 5 are joined together and connected to the fuselage 4 with a vertical stabilizer fin 7, in a typical embodiment. There are different embodiments in the field of the prior art but one common feature is that the distance between the front part of the front wing 3 and the rear part of the rear wing 5 is smaller, or significantly smaller, than the length of the fuselage 4.

The monoplane wing area is basically the same as the total wing area of the box wing aircraft, if the same weight must be lifted. When inventors and manufacturers design their modern box wing aircraft, they use narrow wings, for aerodynamic reasons, and their wingspan is not significantly different from the wingspan of the monoplane they want to compete with.

FIG. 1 also indicates one application of the area rule design principle for monoplanes, namely making the fuselage 2 thinner where the cross-sectional area of the wings is largest. The corresponding area rule solution for a box wing aircraft is to make the fuselage 4 wider between the wings because the cross-sectional area of the wings is smallest at midway between the front wing 3 and the rear wing 5. The fuselage of the box wing aircraft 4 is therefore provided with a wide belly extension 8, as it is shown in FIG. 2.

A significant conceptual difference between the monoplane and the box wing concept is that the large wing volume of a monoplane is generally used to contain large fuel tanks while the thin box wings cannot hold a lot of fuel, and therefore, the wide belly extension 8 of the fuselage 4 is suitable as a fuel tank.

Figure 3:
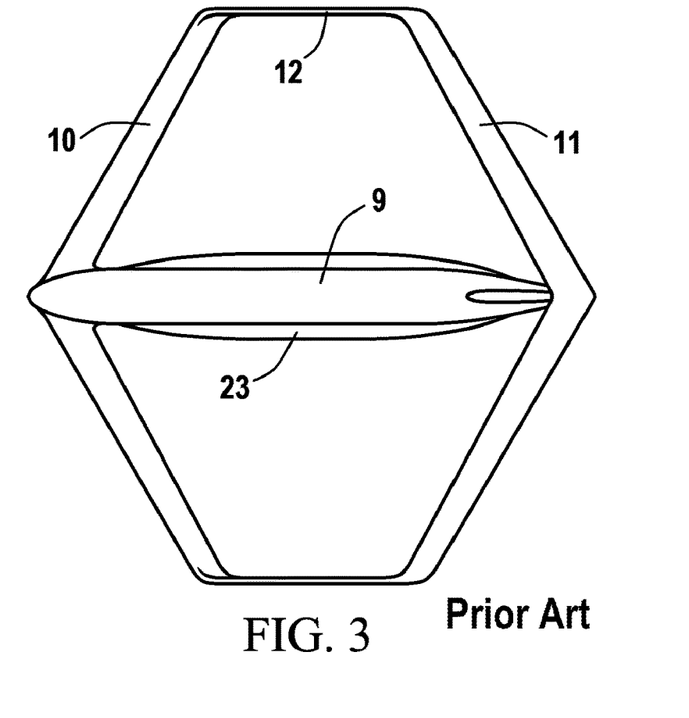
FIG. 3 is a top view illustration of an extended fuselage with regular, conventional box wings, when maximal horizontal separation is obtained.

FIG. 3 is an illustration of a box wing aircraft applied to a longer fuselage 9 where the front wing 10 is located as front as possible and the rear wing 11 is located as rear as possible. The reasons for moving the front wing 10 and the rear wing 11 as far from each other as possible are to achieve good horizontal separation between the wings; to obtain lifting forces as close to the front, and respectively, as close to the rear as possible; as well as to have aerodynamic devices, stabilizing functions and maneuverability as far from the center of gravity as possible, and thereby reducing cargo placement issues, reducing the risk for stall and increasing safety. The prior art does not prioritize this idea, because visibility in front is more important to manufacturers.

The long fuselage 9 in FIG. 3 and the location of the front and rear wings, 10 and 11, provide very good horizontal separation between the wings, but the disadvantage is that the wingtips are too far away from each other, needing a very long, and thereby weak, connecting wingtip fence 12.

Figure 4:
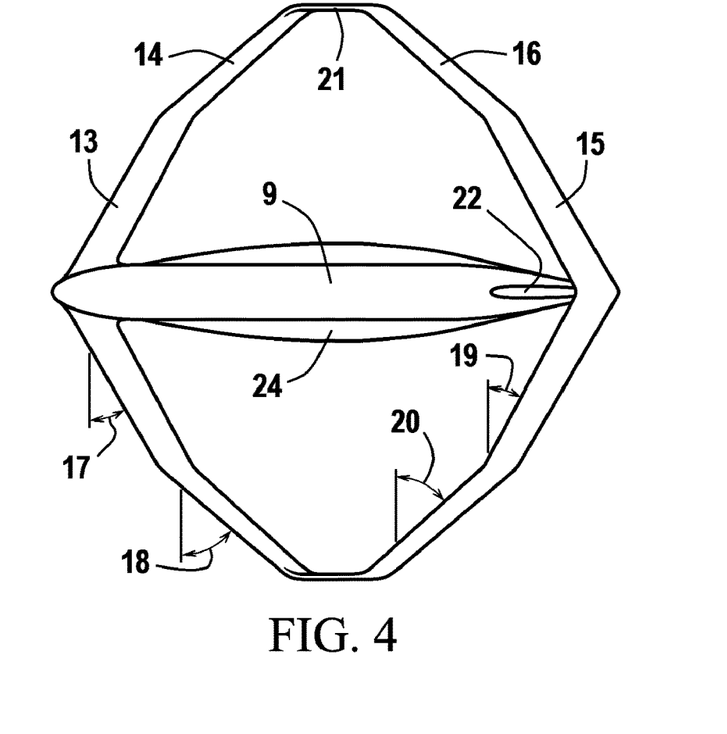
FIG. 4 is a top view illustration of an extended fuselage with angled front and angled rear wing sections in a box wing configuration, when maximal horizontal separation is obtained.

The solution provided by the present invention is shown in FIG. 4, namely a division of the front wing into a root section 13 and a tip section 14, as well as a division of the rear wing into a root section 15 and a tip section 16. The root and the tip sections are differently swept. The root of the root section 13 of the backward swept front wing joins the fuselage 9 near the lower part of the nose. This root section 13 is dihedral and slightly tapered. The wingtip of the root section 13 of the front wing joins the root of the tip section 14 of the front wing. This tip section 14 is also slightly tapered and dihedral, but more dihedral than the root section 13.

In the embodiment shown in FIG. 4, the root section 13 of the backward swept front wing has a sweep angle 17 similar to that of a modern airliner. This sweep angle 17 is smaller than the sweep angle 18 of the backward swept tip section 14 of the front wing. The root section 15 of the forward swept rear wing has basically the same sweep angle 19 as the sweep angle 17 of the root section 13 of the front wing, but this angle 19 is a forward sweep angle. This sweep angle 19 is smaller than the sweep angle 20 of the forward swept tip section 16 of the rear wing. Thereby the wingtip fence 21 is shorter, and stronger, compared to the wingtip fence 12 of the prior art, when the box wings 10 and 11, having straight leading edges, are longitudinally well separated, as shown in FIG. 3.

The root of the root section 15 of the forward swept rear wing, in FIG. 4, is elevated above the aft part of the fuselage 9. In one embodiment, this root section 15 of the rear wing is connected to the aft part of the fuselage 9 with a vertical stabilizer 22. The root section 15 of the forward swept rear wing is slightly tapered and basically horizontal. The wingtip of the root section 15 of the rear wing joins the root of the tip section 16 of the rear wing. This tip section 16 is slightly tapered and slightly anhedral.

The wingtip of the backward swept tip section 14 of the front wing and the wingtip of the forward swept tip section 16 of the rear wing are structurally connected with a wingtip fence 21, which is a non-tapered, backward swept non-lifting side wing. The lower front end of this wingtip fence 21 is joined to the wingtip of the tip section 14 of the front wing and its higher rear end is joined to the wingtip of the tip section 16 of the rear wing. All the structural connections between the parts of the present invention are established in a way which is understood by those skilled in the art.

Having a front wing 10 as front as possible and the rear wing 11 as rear as possible as in FIG. 3 results in a need for a longer wide-belly fuselage extension part 23, compared to the length of the wide-belly fuselage extension 8 in FIG. 2, if the area rule design method is to be applied. When the front wing sections 13 and 14 are angled, as well as the rear wing sections 15 and 16 in FIG. 4, the wide-belly section 24 need to be even wider in the middle, if the area rule design method is to be applied. Designing a wider belly section of the fuselage, using the area rule method, with reference to 8 in FIG. 2, 23 in FIGS. 3 and 24 in FIG. 4, is not limited to how wide the belly part is but rather more generally applies to a larger cross-sectional area of the fuselage.

Thereby, each of the method steps of (i) extending the length of the fuselage; (ii) moving the front and rear wings longitudinally as far as possible from each other; as well as (iii) introducing angled front and angled rear wings, contributes to obtaining a large fuel tank in the fuselage belly extension, which can contain enough fuel for long range flights. At the same time, the angled front and rear wings shorten the wingtip fence 21, as shown in FIG. 4, compared to the disadvantageously long wingtip fence 12, shown in FIG. 3, which is the result when the front and rear wings, 10 and 11 respectively, have basically unchanged sweep angle from root to tip. But the wingspan problem with a really large aircraft still remains.

Figure 5:
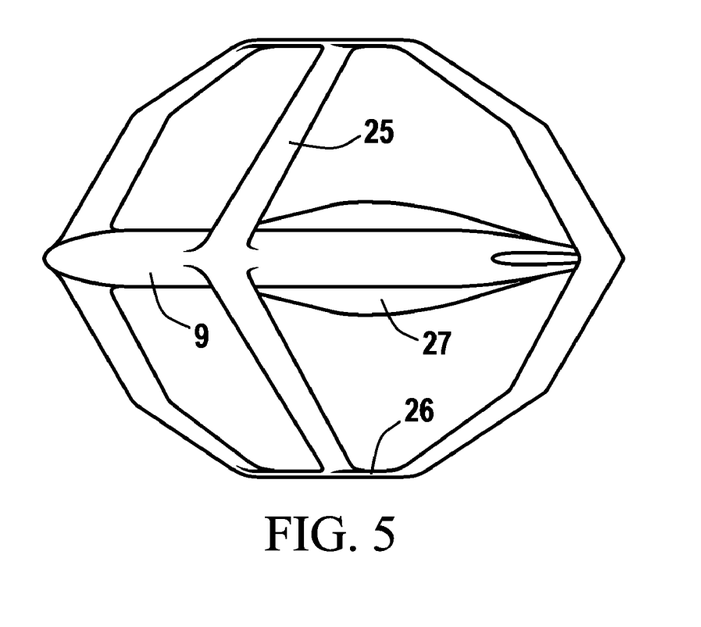
FIG. 5 is a top view illustration of angled front and angled rear wing sections in a box wing configuration; embodiment with short wingspan and a simple middle wing.

The solution is to introduce a middle wing 25, as shown in FIG. 5. The same total wing area as in FIG. 4 can be achieved by three pairs of narrow wings which are shorter, as shown in FIG. 5. The wingspan is reduced by approximately one third.

This simple middle wing 25 in FIG. 5 is very similar to a regular wing of a monoplane aircraft but it does not have to be as massive because the load per wing is lower, the wing 25 is shorter, and the wingtip of this middle wing 25 is joined to the wingtip fence 26, gaining an advantage from the well-known strength and stiffness of the box wing concept. This reinforcement effect is mutual. The wingtip fence 26 in FIG. 5 is supported by this middle wing 25 as well, reducing bending, torsion and vibration on the wingtip fence 26.

The root of the middle wing 25 in FIG. 5 is mounted to the upper middle part of the fuselage 9. This middle wing 25, as swept and as tapered as shown in FIG. 5 is only one embodiment but the shape is not limited to the planform shown. However, a swept middle wing is preferable because, among other reasons, the wide-belly extension 27 of the fuselage 9 is still large enough as a fuel tank, using the area rule design method.

Figure 6:
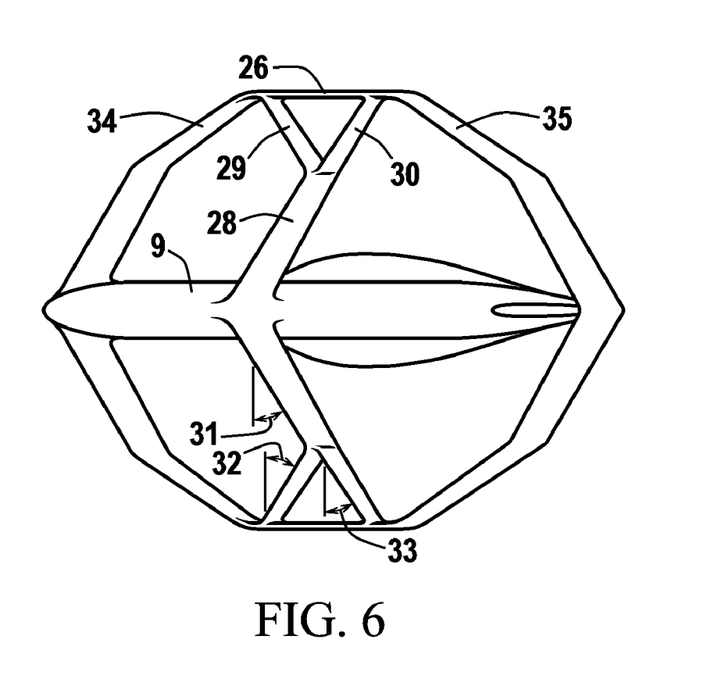
FIG. 6 is a top view illustration of angled front and angled rear wing sections in a box wing configuration; embodiment with short wingspan and a middle wing with two tip sections.

An even more preferable embodiment of a middle wing is shown in FIG. 6, where the middle wing is divided into a backward swept root section 28 and two tip sections, one forward swept 29 and one backward swept 30. The root section 28 of the middle wing is slightly tapered, basically horizontal or slightly anhedral. The tip sections 29 and 30 are slightly tapered.

In the preferred embodiment shown in FIG. 6, the backward sweep angle 31 of the root section 28 of the middle wing is basically the same as the forward sweep angle 32 of the forward swept tip section 29 of the middle wing, as well as the backward sweep angle 33 of the backward swept tip section 30 of the middle wing. These sweep angles, 31, 32 and 33, are basically the same as the sweep angle of the wing of a modern monoplane airliner.

The wingtip of the forward swept tip section 29 of the middle wing in FIG. 6 joins the wingtip fence 26 vertically above and horizontally behind the wingtip of the tip section 34 of the front wing. The wingtip of the backward swept tip section 30 of the middle wing joins the wingtip fence 26 vertically below and horizontally ahead the wingtip of the tip section 35 of the rear wing. The structural connection between the wingtip fence 26 and the two tip sections, 29 and 30, of the middle wing, is not limited to this particular embodiment. Using streamlined longitudinal aerodynamic bodies as structural interconnecting parts where the wingtips are connected to the wingtip fence 26, or other different structures, established in a manner which is understood by those skilled in the art, do not depart from the scope of this invention.

Figure 7:
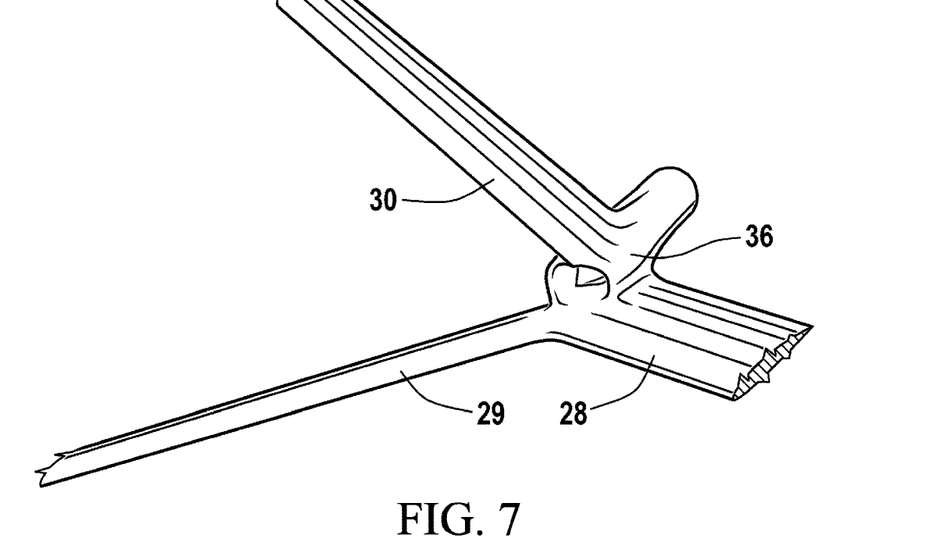
FIG. 7 is an enlarged partial perspective view of an embodiment where the root section of the middle wing is connected to the forward swept and the backward swept tip sections.

The root of the root section 28 of the middle wing in FIG. 6 joins the upper part of the fuselage 9. The preferred embodiment where the root section 28 of the middle wing joins the root of the forward swept tip section 29 of the middle wing as well as the root of the backward swept tip section 30 of the middle wing is shown in FIG. 7, in a partial, perspective view. Other embodiments having different structures do not depart from the scope of this invention.

The root chords of the tip sections 29 and 30 in the preferred embodiment shown in FIG. 7 have basically the same length and this chord length is smaller than the wingtip chord of the root section 28 of the middle wing. Furthermore, the root of the backward swept tip section 30 of the middle wing is vertically elevated and horizontally located further back, compared to the root of the forward swept tip section 29 of the middle wing.

The reason for this solution, in this particular embodiment shown in FIG. 7, is to obtain a vertical and horizontal separation between the two root chords of the tip sections, 29 and 30. At the same time, the larger chord for the wingtip of the root section 28 of the middle wing makes this root section 28 of the middle wing, by definition, stronger, which is strongly recommended because this root section 28 is a suitable place for locating engines or any other kind of propulsion with large forces on the wing structure.

The embodiment in FIG. 7 shows an elevated backward swept tip section 30, elevated above the tip section 29 and the root section 28, that are joined on the same, lower vertical level. The structural distance bridge in this embodiment is an embedded, structurally integrated engine housing 36.

Figure 8:
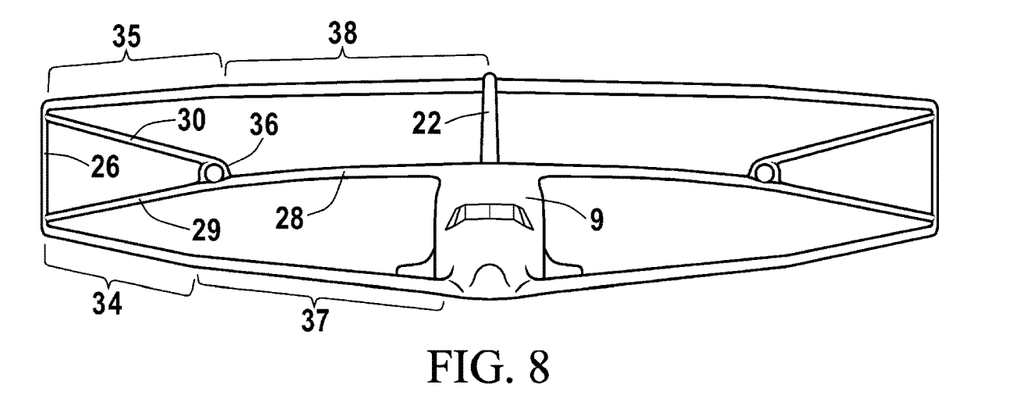
FIG. 8 is a front elevation view of an embodiment where the middle wing has two tip sections and the rear wings are supported by a vertical stabilizer.

FIG. 8 shows the same embodiment of the invention. The forward swept tip section 29 of the middle wing is anhedral, basically as much as the tip section 34 of the front wing is dihedral. And, the forward swept tip section 29 of the middle wing is basically as much anhedral as the backward swept tip section 30 of the middle wing is dihedral. Other embodiments having different structures do not depart from the scope of this invention.

FIG. 8, compared to FIG. 2, clearly shows the structural difference between the regular, conventional box wing concept and the present invention. While the closed frame structure of the prior art is formed by the front wing 3, the rear wing 5, the connecting wingtip fence 6, the vertical stabilizer 7 and the fuselage 4 in FIG. 2, the embodiment of the invention in FIG. 8 has three times more closed frames, which is a considerable structural reinforcement.

One closed frame in FIG. 8 is formed by the root and tip sections, 37 and 34, of the front wing, a small portion of the wingtip fence 26, the anhedral forward swept tip section 29 of the middle wing, the root section 28 of the middle wing and the fuselage 9. Another closed frame in the same FIG. 8 is formed by the vertical stabilizer 22, the root section 38 and the tip section 35 of the rear wing, a small portion of the wingtip fence 26, the dihedral backward swept tip section 30 of the middle wing, the structural bridge 36, the root section 28 of the middle wing and the fuselage 9. The third closed frame is formed by the wingtip fence 26, the forward swept 29 and backward swept 30 tip sections of the middle wing, and the structural bridge 36. The other half of the embodiment, the mirror image, has also three closed frames.

Figure 9:
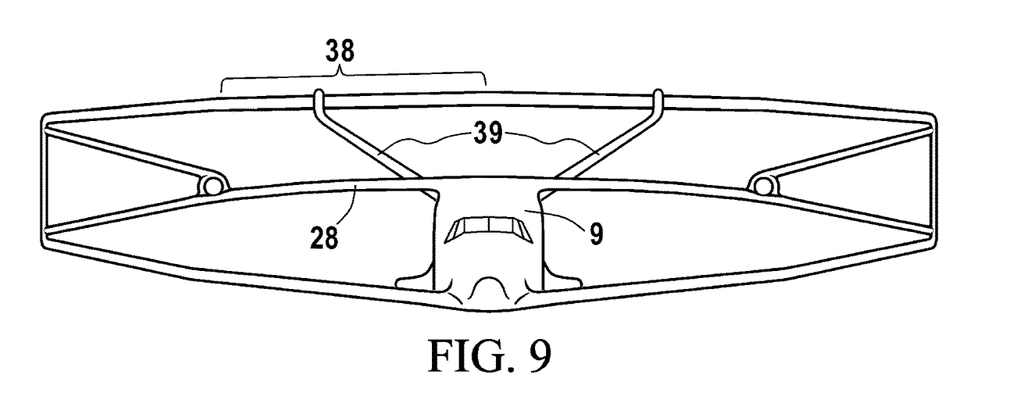
FIG. 9 is a front elevation view of an embodiment where the middle wing has two tip sections and the rear wings are supported by V-tail fins.

FIG. 9 shows a modified and preferred embodiment with two symmetric tail fins 39 in a V-tail configuration, instead of the single stabilizer 22 shown in FIG. 8. The two V-tail fins 39 in FIG. 9 together with portions of both root sections 38 of the rear wings and the aft portion of the fuselage 9 form one more closed frame, compared to the number of frames in FIG. 8. The total number of closed frames of the embodiment in FIG. 9 is seven, and this feature of the invention provides exceptional structural strength and stiffness for this new box wing configuration.

The main part of the airflow around the aircraft of the present invention is forced to go through these frames, formed by the wing sections and other structural parts of the aircraft. The stream flow is divided into seven aerodynamic channels at the most, as shown in FIG. 9. This novel feature of the present invention provides substantial aerodynamic improvement.

Figure 10:
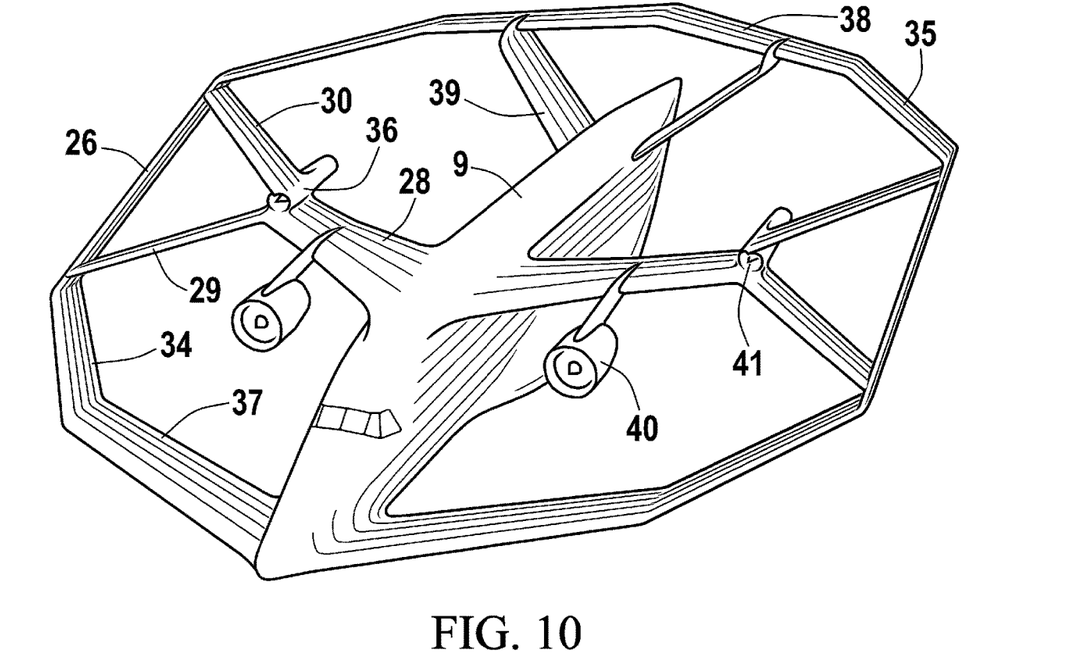
FIG. 10 is a perspective view of an embodiment of the invention with combined propulsion.

As was mentioned, the box wing aircraft configuration implicitly disclosed in RCD EM 002544510-0001 is not functional. All four engines are Ramjet-type and they cannot lift the aircraft from the runway because they need an established airflow of several hundred km/h to start. FIG. 10 shows the solution which makes the aircraft EM 002544510-0001 functional. The two inner engines, 40 on both sides, are traditional gas turbine engines in the present invention, preferably turbofan or turboprop, which can provide the necessary airflow needed for the two outer, Ramjet-type, engines, 41 on both sides, to start after liftoff.

The propulsion for the box wing aircraft of the present invention shown in FIG. 10 is not limited to turboprop, turbofan and Ramjet-type engines. Having other kind of propulsion systems and a combination of different propulsion systems, as well as distributed propulsion, do not depart from the scope of this invention.

Figure 11:
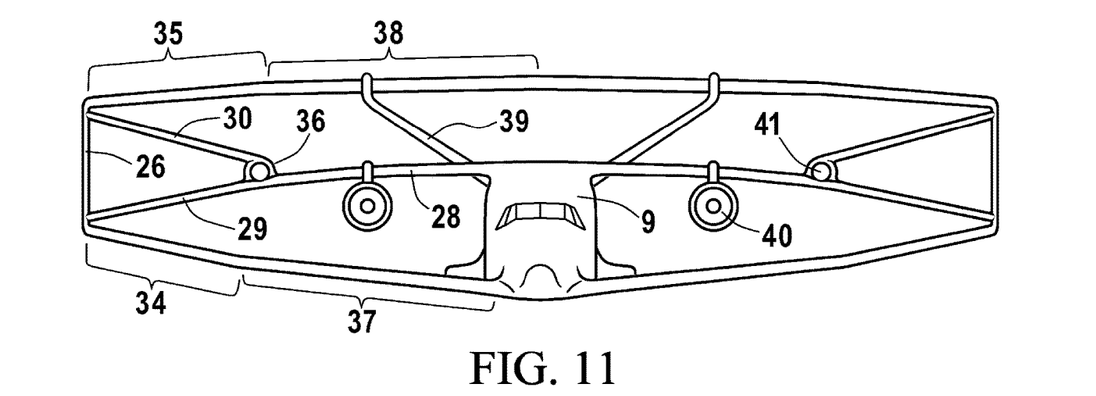
FIG. 11 is a front elevation view of the aircraft of FIG. 10.
Figure 12:
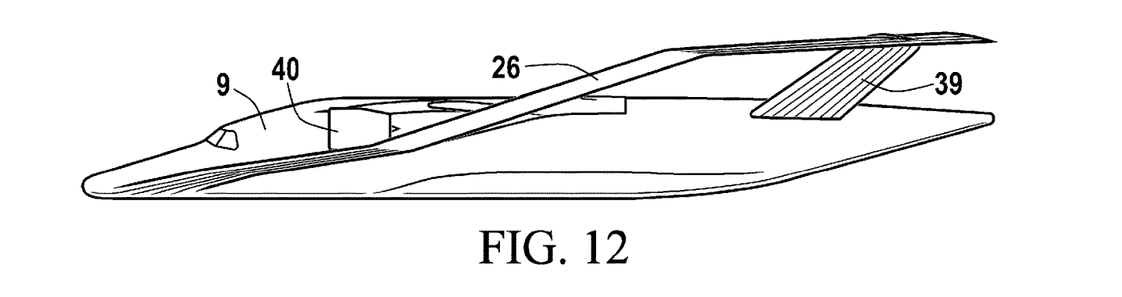
FIG. 12 is a side elevation view of the aircraft of FIG. 10; the right and left side views are mirror images.
Figure 13:
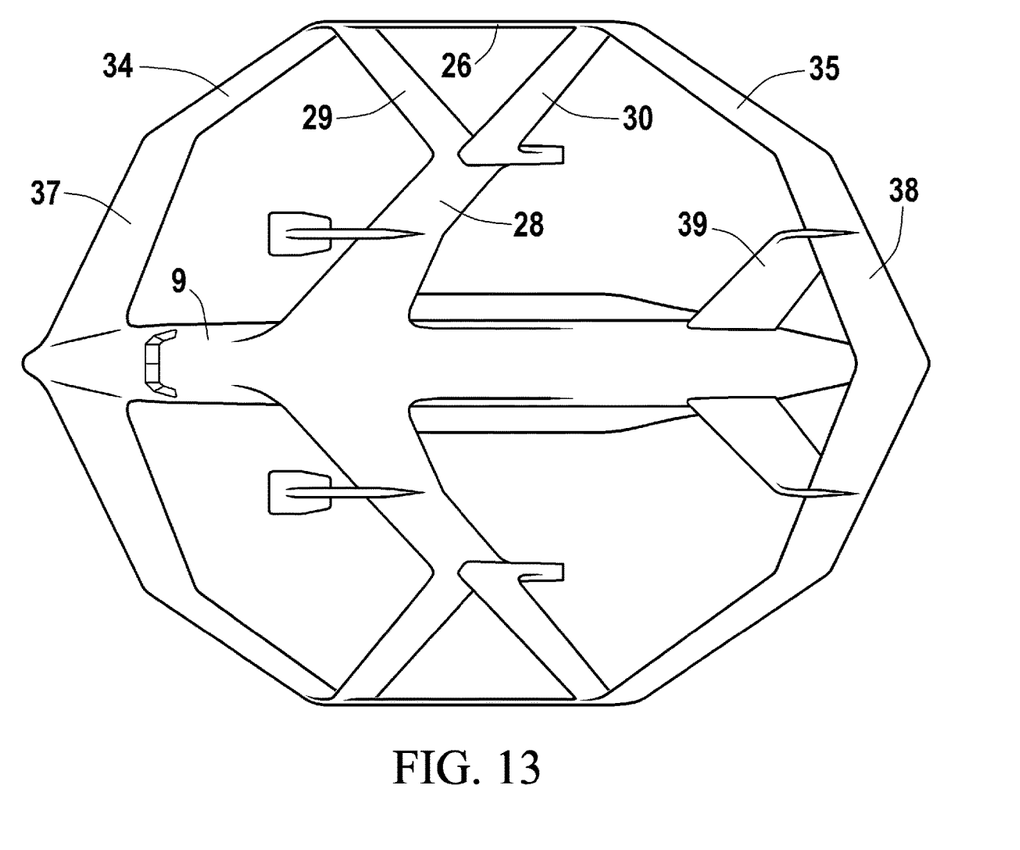
FIG. 13 is a top plan view of the aircraft of FIG. 10.
Figure 14:
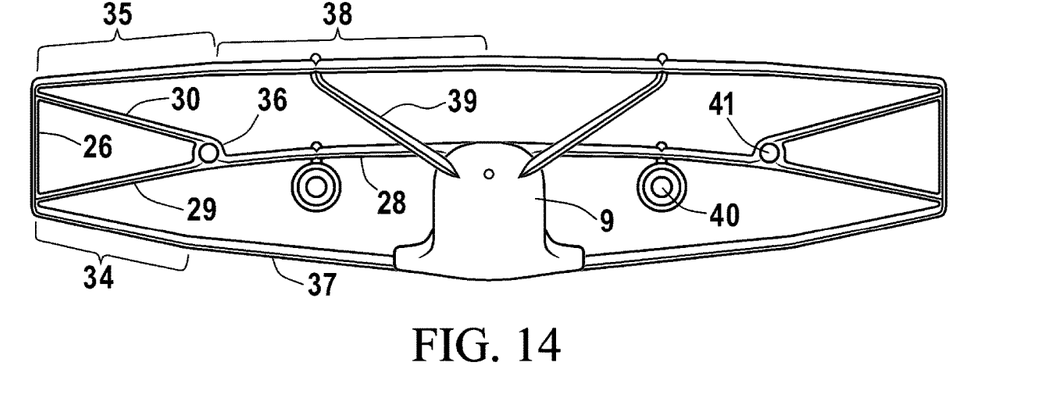
FIG. 14 is a rear elevation view of the aircraft of FIG. 10.
Figure 15:
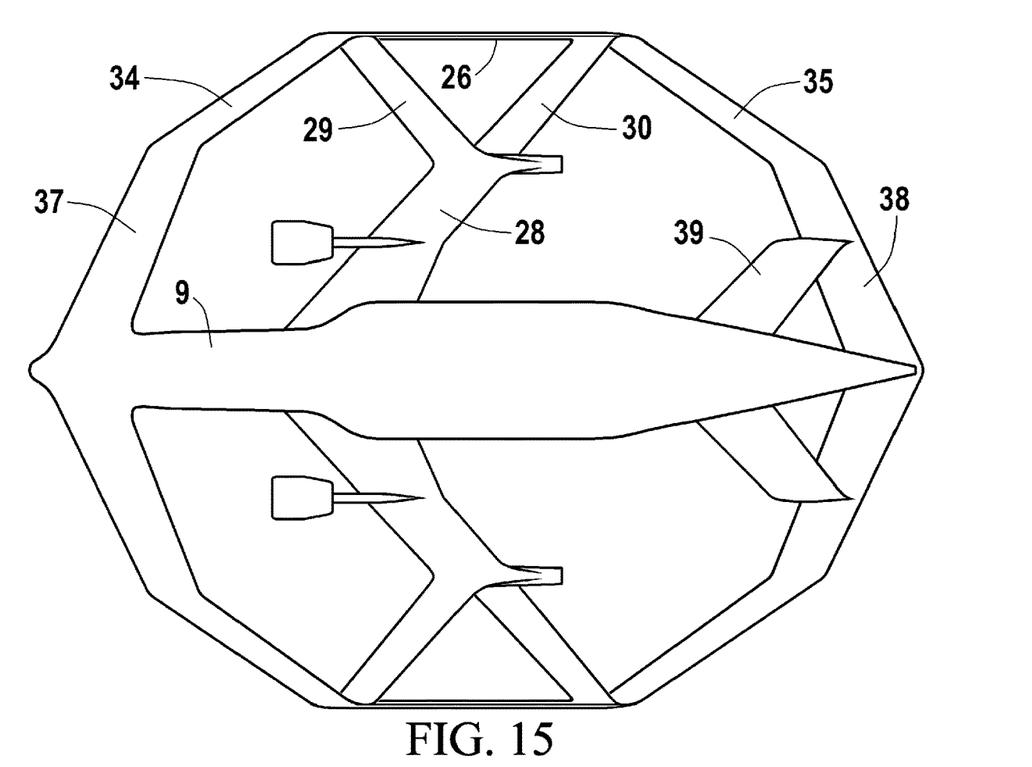
FIG. 15 is a bottom plan view of the aircraft of FIG. 10.

FIG. 11 to FIG. 15 are different views of the aircraft of FIG. 10, which is the perspective view of the preferred embodiment of the present invention, with combined propulsion. The front and rear views, FIG. 11 and FIG. 14, are shown in enlarged scale, compared to dimensions of the side, top and bottom views, FIGS. 12, 13 and 15 respectively.

The box wing aircraft concept cannot be accepted for passenger traffic before a solution for convenient embarking and disembarking is presented. Airport boarding bridges cannot come close enough to the passenger door especially when the front wing is attached to the nose, as in the present invention. However, it is not a law of nature that we must use boarding bridges for embarking and disembarking. Very large passenger aircraft are desired and the boarding bridges are a bottleneck, box wing aircraft or not.

Figure 16:
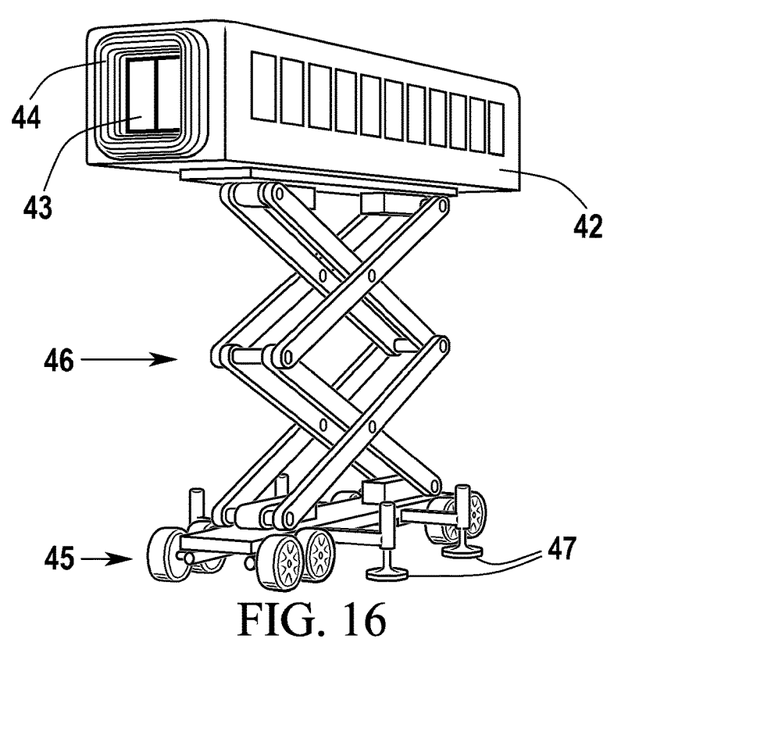
FIG. 16 is a perspective view illustration of an Airport Shuttle Vehicle for embarking and disembarking a box wing aircraft, with the passenger cabin in elevated position.
Figure 17:
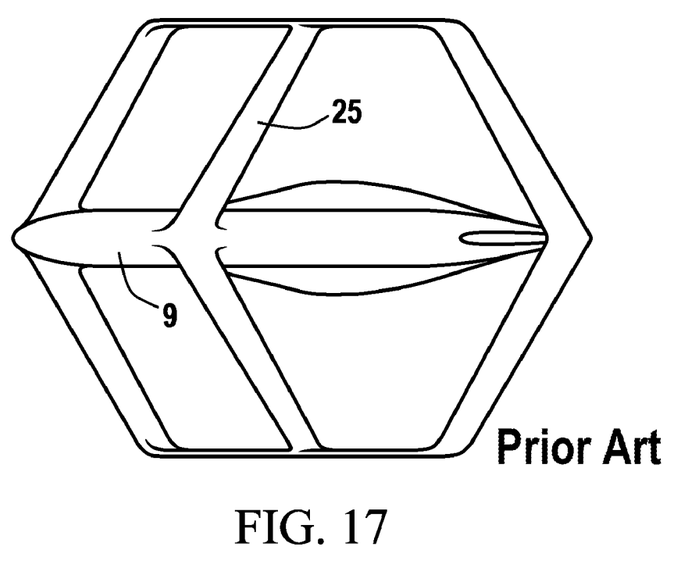
FIG. 17 is a top view illustration of an extended fuselage with regular, conventional box wings; embodiment with short wingspan and a simple middle wing.
Figure 18:
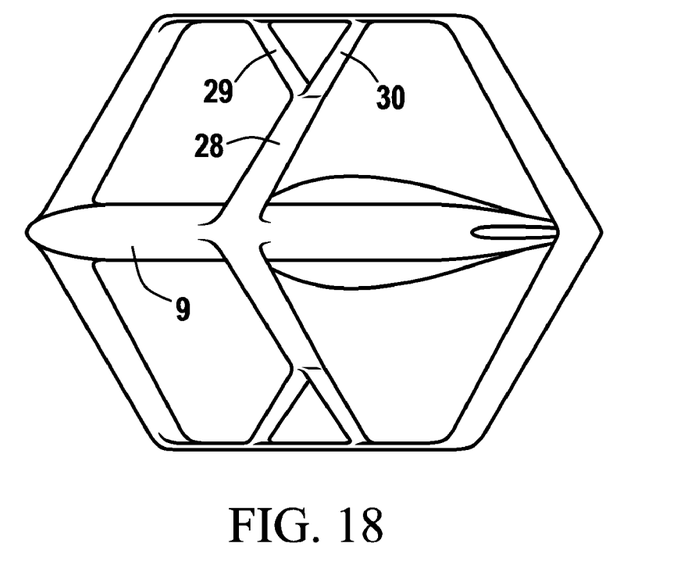
FIG. 18 is a top view illustration of a box wing configuration; embodiment with short wingspan and a middle wing with two tip sections.
Figure 19:
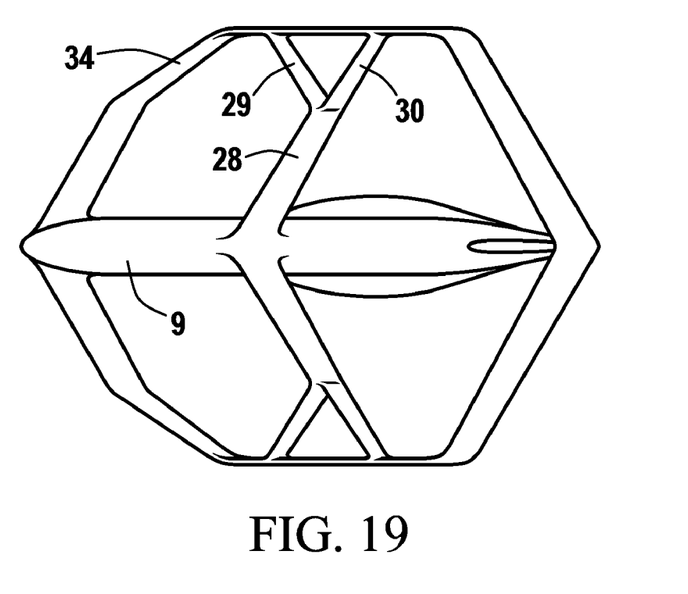
FIG. 19 is a top view illustration of a box wing configuration with angled front wing section; embodiment with short wingspan and a middle wing with two tip sections.
Figure 20:
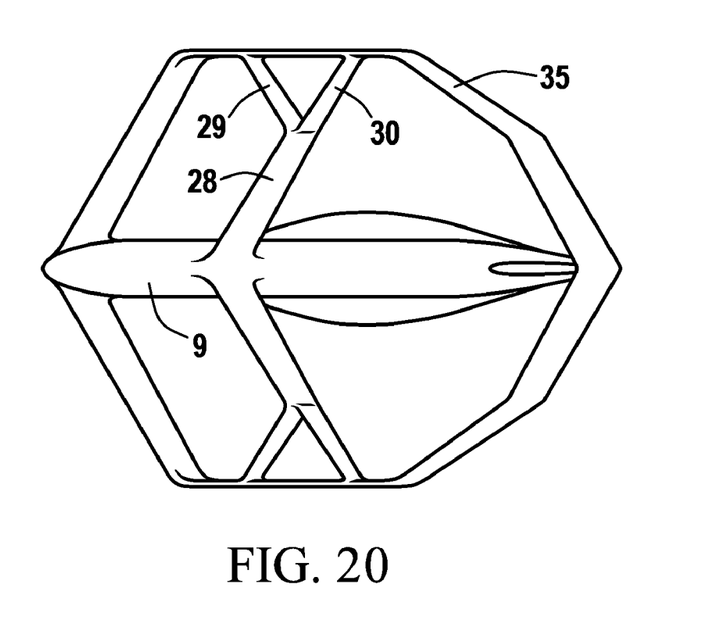
FIG. 20 is a top view illustration of a box wing configuration with angled rear wing section; embodiment with short wingspan and a middle wing with two tip sections.

FIG. 16 shows an Airport Shuttle Vehicle, for quick embarking-disembarking, designed with the box wing aircraft concept in mind, comprising a passenger cabin 42 with front and rear doors 43 with a surrounding frame 44, able to absorb shocks when the cabin door 43 docks to a passenger door of the aircraft or to a door of the airport terminal building; an undercarriage 45 including but not limited to a scissor mechanism 46 for lifting the cabin 42; at least one foldable or expandable side support leg 47 on each side, for stability and safety reasons; and necessary sensors and equipment to operate the vehicle. FIG. 16 shows the passenger cabin 42 in elevated position and the side support legs 47 expanded.

The passenger doors of the box wing aircraft must be located in positions easily accessible for docking with such Airport Shuttle Vehicles; preferably several vehicles simultaneously docked to each passenger deck on both sides of the aircraft. Embarking and disembarking can be quick even for a large box wing airliner with more than thousand passengers, using a fleet of shuttle vehicles. Such an Airport Shuttle Vehicle has simple tasks in a controlled environment which means great opportunity for unmanned, adaptive preprogrammed operation under limited human supervision.

There are similar existing mobile passenger lounges, although without side support legs; as well as catering and cargo load vehicles, with side support legs but without passenger cabins. The patentability of this particular Airport Shuttle Vehicle is therefore limited, but this enhanced large-scale embarking-disembarking system is worth mentioning as an effort to eliminate one of the shortcomings of the box wing concept for large airliners.

The invention claimed is:

1. A manned or unmanned aircraft comprising:
   a) a fuselage (9), having a longitudinal axis;
   b) a pair of backward swept front wings attached to the front bottom of the fuselage (9), each one of the pair of backward swept front wings comprising
      (i) a root section (37), which is the inboard section, closest to the fuselage (9), joined to the front bottom of the fuselage (9), having a dihedral angle between 0 and 15 degrees, and having a taper ratio between 1:1 and 1:3;
      (ii) a tip section (34), joined to the root section (37), having a taper ratio between 1:1 and 1:3, and a larger dihedral angle than the root section (37), more backward swept than the root section (37), wherein the leading edge of the tip section (34) is more backward swept than the leading edge of the root section (37);
   c) a pair of forward swept rear wings in an elevated position compared to the pair of backward swept front wings, structurally connected to the upper aft part of the fuselage (9), each one of the pair of forward swept rear wings comprising
      (i) a root section (38), which is the inboard section, closest to the fuselage (9), having a taper ratio between 1:1 and 1:3;
      (ii) a tip section (35), joined to the root section (38), having an anhedral angle between 0 and 30 degrees, having a taper ratio between 1:1 and 1:3, more forward swept than the root section (38), wherein the trailing edge of the tip section (35) is more forward swept than the trailing edge of the root section (38);
   d) a wingtip fence (26) on each side of the aircraft, which is a backward swept side wing, having an airfoil, a leading edge, a trailing edge and two surfaces, connecting the wingtip of the tip section (34) of the backward swept front wing and the wingtip of the tip section (35) of the forward swept rear wing.

2. The aircraft of claim 1, wherein the root sections (38) of the pair of forward swept rear wings are attached to the upper aft part of the fuselage (9).

3. The aircraft of claim 1, wherein the root sections (38) of the pair of forward swept rear wings are joined together above the aft part of the fuselage (9), and the structural connection between the fuselage (9) and the pair of forward swept rear wings in the elevated position is established by using at least one stabilizer (22), which is a backward swept tail fin extending from the upper aft part of the fuselage (9).

4. The aircraft of claim 1, wherein the root sections (38) of the pair of forward swept rear wings are joined together above the aft part of the fuselage (9), and the structural connection between the fuselage (9) and the pair of forward swept rear wings in the elevated position is established by using a V-tail configuration, namely two backward swept tail fins (39) extending from the upper aft part of the fuselage (9), having an angle between them in the range 45 to 137.5 degrees.

5. The aircraft of claim 1, further comprising a pair of backward swept middle wings (25), horizontally and vertically located between the pair of backward swept front wings and the pair of forward swept rear wings, wherein each of the roots of these backward swept middle wings (25)

is attached to the fuselage (9), and the tip of one of these backward swept middle wings (25) is joined to the mid-portion of the wingtip fence that is located on the right side of the fuselage, while the tip of the other one of these backward swept middle wings (25) is joined to the mid-portion of the wingtip fence that is located on the left side of the fuselage.

6. The aircraft of claim 1, further comprising a pair of middle wings, horizontally and vertically located between the pair of backward swept front wings and the pair of forwards swept rear wings, each of these middle wings comprising:

a) a backward swept root section (28), which is the inboard section, extending from the fuselage (9), horizontal or having an anhedral angle between 0 and 15 degrees;

b) a forward swept, anhedral tip section (29), with its root joined to the wingtip of the said root section (28) of the middle wing and with its wingtip joined to the lower front portion of the wingtip fence (26);

c) a backward swept, dihedral tip section (30), elevated above the said forward swept tip section (29), with its root connected to the wingtip of the said root section (28) of the middle wing and with its wingtip joined to the upper aft portion of the wingtip fence (26);

d) a structural connecting part (36), for smooth bridging of the vertical distance between         i) the joined forward swept tip section (29) and the backward swept root section (28) of the middle wing, and         ii) the root of the backward swept tip section (30) of the middle wing which is located at an elevated vertical level, elevated above the root of the said forward swept tip section (29);

wherein said structural bridging part (36) is preferably but not exclusively a portion of an engine housing, at a lower vertical level structurally integrated with the forward swept tip section (29) and the backward swept root section (28), and also integrated, at an elevated level, with the root portion of the backward swept tip section (30) of the middle wing.

\* \* \* \* \*